(12) United States Patent
Mao et al.

(10) Patent No.: US 10,817,443 B2
(45) Date of Patent: Oct. 27, 2020

(54) CONFIGURABLE INTERFACE CARD

(71) Applicant: SK Hynix Inc., Gyeonggi-do (KR)

(72) Inventors: Jinliang Mao, Milpitas, CA (US); JongSu Lee, Cupertino, CA (US)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 16/264,320

(22) Filed: Jan. 31, 2019

(65) Prior Publication Data

US 2019/0303318 A1 Oct. 3, 2019

Related U.S. Application Data

(60) Provisional application No. 62/649,494, filed on Mar. 28, 2018.

(51) Int. Cl.
*G06F 13/20* (2006.01)
*G06F 13/42* (2006.01)

(52) U.S. Cl.
CPC .......... *G06F 13/20* (2013.01); *G06F 13/4282* (2013.01); *G06F 2213/0026* (2013.01)

(58) Field of Classification Search
CPC .................. G06F 13/20; G06F 13/4282; G06F 2213/0026
See application file for complete search history.

(56) References Cited

U.S. PATENT DOCUMENTS

| | | | |
|---|---|---|---|
| 8,571,059 B1 * | 10/2013 | Zaliznyak | G06F 13/385 370/464 |
| 9,071,256 B1 * | 6/2015 | Reiss | H03M 9/00 |
| 9,842,075 B1 * | 12/2017 | Davis | G06F 13/385 |
| 9,847,802 B1 * | 12/2017 | Farley | H04B 1/0483 |
| 2014/0181355 A1 | 6/2014 | Barbiero et al. | |
| 2015/0074320 A1 * | 3/2015 | Galles | H04L 29/12367 710/313 |
| 2016/0170914 A1 | 6/2016 | Pethe et al. | |
| 2017/0220505 A1 | 8/2017 | Breakstone et al. | |
| 2017/0344512 A1 * | 11/2017 | Jen | G06F 13/4068 |
| 2018/0032463 A1 * | 2/2018 | Olarig | G06F 13/4022 |

* cited by examiner

*Primary Examiner* — Henry Tsai
*Assistant Examiner* — John B Roche
(74) *Attorney, Agent, or Firm* — Kilpatrick Townsend & Stockton LLP

(57) ABSTRACT

An apparatus supporting a plurality of operational modes includes a physical interface having a plurality of lanes, an endpoint device having a plurality of interfaces, a plurality of multiplexers disposed between the physical interface and the endpoint device, and a controller configured to route a first portion of the lanes to a first portion of the interfaces through the multiplexers in response to a selected mode of the plurality of operational modes.

20 Claims, 14 Drawing Sheets

Table 1

| Backplane | | PH1 | PH2 | PH3 | PH4 | PH5 | PH6 |
|---|---|---|---|---|---|---|---|
| 1x4 | U2 | S0 | P0 | S1 | P1 | P2 | P3 |
|  | U3 | S0 | NA | S1 | S2 | S3 | NA |
| 2x2 | U2 | S0 | P0 | S1 | P1 | P2 | P3 |
|  | U3 | P0 | NA | P1 | P2 | S3 | NA |
| 1x2 | U2 | S0 | P0 | S1 | P1 | | |
|  | U3 | P0 | NA | P2 | NA | | |
| 1x1 | U2 | S0 | P0 | | | | |
|  | U3 | P0 | NA | | | | |

S0: SAS0/SATA, S1: SAS1
P0: PCIe0, P1: PCIe1, P2: PCIe2, P3: PCIe3

Table 2

| PCIE PHY Pin | Port0 1X8 | Port0X4+Port1X4 | U.2 1X4 | U.2 2X2 | U.3 1X4 | U.3 2X2 |
|---|---|---|---|---|---|---|
| Pin0 | Port0 Lane0 | Port0 Lane0 | | Port0 Lane0 | Port0 Lane0 | Port0 Lane0 |
| Pin1 | Port0 Lane1 | Port0 Lane1 | | | | |
| Pin2 | Port0 Lane2 | Port0 Lane2 | Port0 Lane0 | Port0 Lane0 | | |
| Pin3 | Port0 Lane3 | Port0 Lane3 | Port0 Lane1 | Port1 Lane0 | Port0 Lane1 | Port1 Lane0 |
| Pin4 | Port0 Lane4 | Port1 Lane0 | Port0 Lane2 | Port1 Lane1 | Port0 Lane2 | Port1 Lane1 |
| Pin5 | Port0 Lane5 | Port1 Lane1 | Port0 Lane3 | | Port0 Lane3 | |
| Pin6 | Port0 Lane6 | Port1 Lane2 | | | | |
| Pin7 | Port0 Lane7 | Port1 Lane3 | | | | |
| Controller lane0 pin number | EP0 lane0: pin0 | EP0 lane0: pin0 EP1 lane0: pin4 | EP0 lane0: pin2 | EP0 lane0: pin1 EP1 lane0: pin4 | EP0 lane0: pin0 | EP0 lane0: pin0 EP1 lane0: pin2 |
| PCIE PHY lane setting | Pin0: link0 master. continuous | Pin0: link0 master. pin4: link1 master. continuous | Pin1: link0 master. pin2 NA | Pin1: link0 master. pin4: link1 master. pin2 NA | Pin0: link0 master. pin1 NA | Pin0: link0 master. pin2: link1 master. pin1 disabled. pin3: link0 slave. pin4: link1 slave |

FIG. 13

CONFIGURABLE INTERFACE CARD

CROSS-REFERENCES TO RELATED APPLICATIONS

This application claims priority to U.S. Provisional Patent Application No. 62/649,494, entitled "PHY FLEXIBLE MUX," filed Mar. 28, 2018, the disclosure of which is hereby incorporated by reference in its entirety for all purposes in the present disclosure.

FIELD OF THE INVENTION

The present invention relates to a computer interconnect architecture, and more particularly to an interface apparatus or hardware module that can automatically be configured to adapt to different enterprise form factors and method for reconfiguring the hardware module.

BACKGROUND

Peripheral Component Interconnect Express (PCI Express or PCIe) is a high-speed serial computer expansion bus standard that is widely used in many computing and communications systems. PCIe itself has been developed to support data rates of 2.5 GB/s for PCIe Generation 1, 5 GB/s for Generation 2, 8 GB/s all the way to 16 GB/s for Generation 4. Multiple PCIe form factors have been available and new form factors are being developed. A new PCIe controller needs to support all the legacy form factors.

In general, different form factors are mechanically incompatible to each other, so that multiple form factor circuit boards or interface cards will not be incorrectly plugged into undesired slots.

The mechanically incompatibility of form factors is good for most cases, but not appropriate for the enterprise case. For example, for the U.2 and U.3 form factors, enterprise environments require compatible form factors between the U.2 and U.3 form factors. With one single form factor, a controller can intelligently determine whether it is a SAS/SATA or PCIe, U.2 or U.3, single port, or dual port device.

To reduce pin count, the U.3 form factor only has 4 lanes of high speed pins. The U.2 form factor has 6 lanes of high-speed pins. Even though the mechanical dimensions of the U.2 and U.3 form factors are compatible to each other, the locations of the actual PCIe pins are not compatible between the 4-lane and 6-lane configurations.

The conventional way to resolve this PCIe pins incompatibility is to use analog multiplexing (alternatively referred to as muxing hereinafter) at the printed circuit board (e.g., motherboard, backplane) level, to multiplex the 4 lanes of the U.3 form factor to the 6 lanes of the U.2 form factor based on some control signals. This printed circuit board (PCB) level multiplexing is operable in applications with relatively low speeds. It is, however, very challenging to operate at very high data rate PCIe links, such as 16 GB/s links.

To resolve this challenge, the present invention provides a logic multiplexing (muxing) mechanism before the analog modules. Moreover, the logic multiplexing mechanism of the present invention can, not only support plug-in cards having U.2 and U.3 form factors, but also future plug-in cards having other flexible form factors.

SUMMARY

Embodiments of the present invention provides an apparatus and method for automatically reassignment logical lanes to pins of a physical interface in response to electrical signals of some configuration pins of the physical interface.

Embodiments of the present invention provide an interface apparatus that supports a plurality of operational modes and configurations. The apparatus includes a physical interface having a plurality of lanes, an endpoint device having a plurality of interfaces, a plurality of multiplexers disposed between the physical interface and the endpoint device, and a controller configured to route a first portion of the lanes to a first portion of the interfaces through the multiplexers in response to a selected mode of the plurality of operational modes. In one embodiment, the endpoint device is a PCIe compatible device.

Embodiments of the present invention also provide a method for assigning logical lanes of an endpoint device to physical pins of a physical interface through a plurality of multiplexers, the endpoint device, wherein the multiplexers and the physical interface are integrated in an apparatus (a circuit card) that supports a plurality of operational modes and configurations.

The following description, together with the accompanying drawings, will provide a better understanding of the nature and advantages of the claimed invention.

BRIEF DESCRIPTION OF THE DRAWINGS

The accompanying drawings form a part of the present disclosure, that describe exemplary embodiments of the present invention. The drawings together with the specification will explain the principles of the invention.

FIG. 13 shows a Table 2 showing example implantations for U.2, U.3, 1×4 and 2×2 configurations according to an embodiment of the present invention.

DETAILED DESCRIPTION OF THE INVENTION

Terms and Definition

Figure 1:
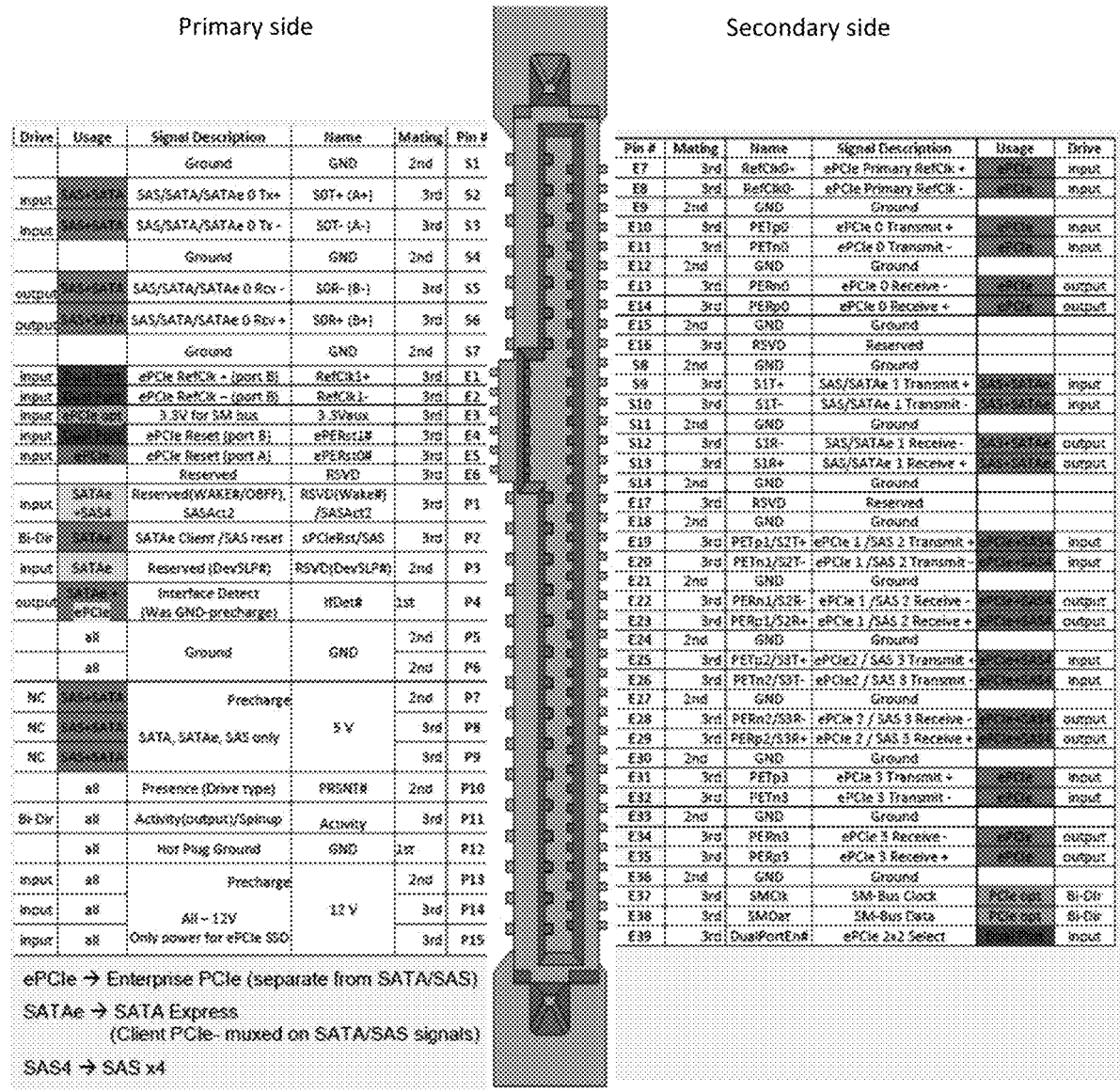
FIG. 1 is a schematic diagram showing definitions of terminals of a PCIe connector.

The PCIe standard defines a link as a connection between two PCI Express (PCIe) devices, i.e., the link is a dual-simplex communications path between two components. A link may include one or more lanes used for communication between two PCIe devices. The PCIe standard further defines a lane as two differential signal pairs (4 wires), one pair for transmission and one pair for reception to enable full-duplex communication between two PCIe devices. A PCIe device may be configured to operate in a plurality of PCIe link widths. A link may aggregate multiple lanes denoted by xN, where N is any of the supported link widths. For example, a by-8 link (or ×8) includes 8 lanes. The PCIe standard describes operations for by-1 (1 lane), by-2 (2 lanes), by-4 (4 lanes), by-8 (8 lanes), by-12 (12 lanes), by-16 (16 lanes), and by-32 (32 lanes) links. A PCIe connector is a connector manufactured according to the PCIe specifications and may support connections for 1, 2, 4, 8, 12, 16, or 32 lanes in a manner similar to PCIe devices. A connector includes a connector body and a plurality of terminals (contacts) arranged in a plurality of rows. The terminals are configured to establish electrical contacts with another electrical components, mechanical plugs, or devices. A PCIe device may include a physical (PHY) interface and a media access control (MAC) interface that support one or more lane configurations (e.g., 1×32, 2×16, 4×8, 16×2, 32×1). The interface between the PHY and MAC interfaces is referred to as the PIPE which is defines by "PHY interface for PCI Express Architecture," published by Intel Corporation. The PCIe standard defines an endpoint as a PCIE enabled I/O adapter (e.g., graphics cards, memory cards). A PCIe lane may also be referred to as a PCIe pin. A circuit card is referred to a device that is plugged into a connector. Bifurcation refers to configuring a number of PCIe lanes into a configuration number of links. Bifurcation enables multiple simultaneous lanes to exist between a host or a number of hosts and an endpoint device having a number of endpoint blocks.

For example, a PCIe lane 0 of a PCIe connector is coupled to a pin 0 of a physical interface of a PCIe device. For example, a PCIe device that supports 8 lanes may be installed into a PCIe connector that physically supports 8, 12, 16, or 32 lanes, but it cannot be installed into a 1, 2, or 4 lanes PCIe connector.

FIG. 1 is a schematic diagram showing definitions of pinouts of an electromechanical connector of a U.2 form factor that can be used for SATA, SAS, and PCIe connection to a motherboard or storage backplane. The pinouts of the connector are arranged in a first side (primary side on the left) and a second side (secondary side on the right) parallel to each other. Some of the pinouts may be used as terminals connecting to ground and different power supply voltages (3.3V, 12V). Some other pinouts may be used as inputs, outputs, bidirectional terminals for SAS, SATA, PCIe transmission and reception.

Figure 2:
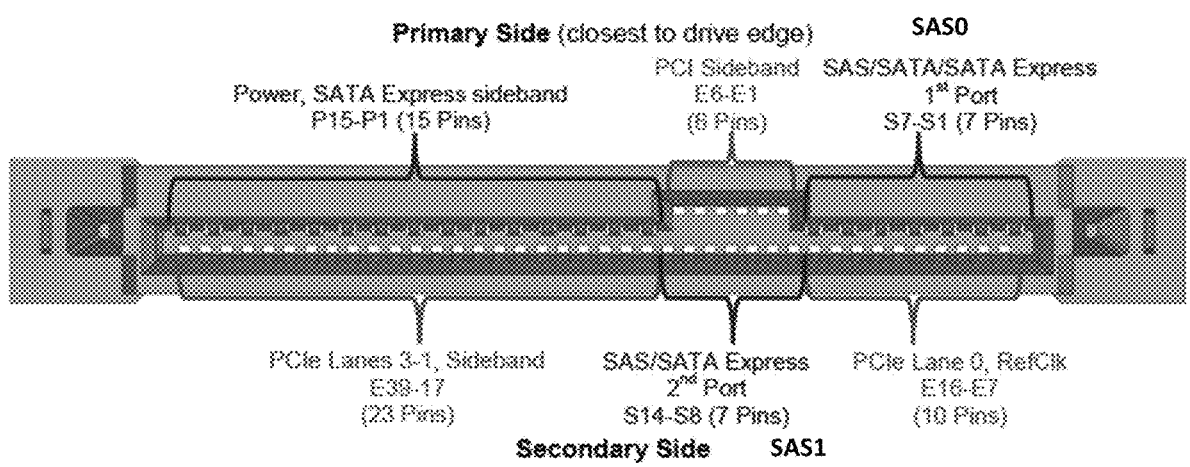
FIG. 2 is a simplified plan view of a PCIe connector installed on a backplane according to an embodiment of the present invention.

FIG. 2 is a schematic diagram showing a mechanical overview of a connector of the U.2 form factor that may be used for SAS, PCIe, U.2. Referring to FIG. 2, the first port of SAS/SATA/SATA Express (also referred to as SAS0) is arranged on the primary side, while the four PCIe lanes (Lane 0-3) and the second port of the SAS/SATA/SATA Express (also referred to as SAS1) are arranged on the secondary side.

Figure 3B:
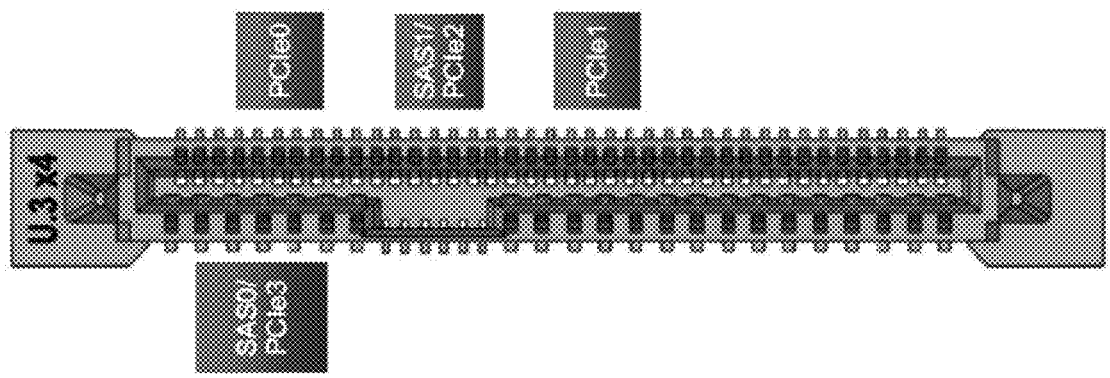
FIG. 3B is a schematic diagram showing the mechanical overview of the connector of the U.3 form factor with the single port after the transition shown in FIG. 3A.
Figure 3A:
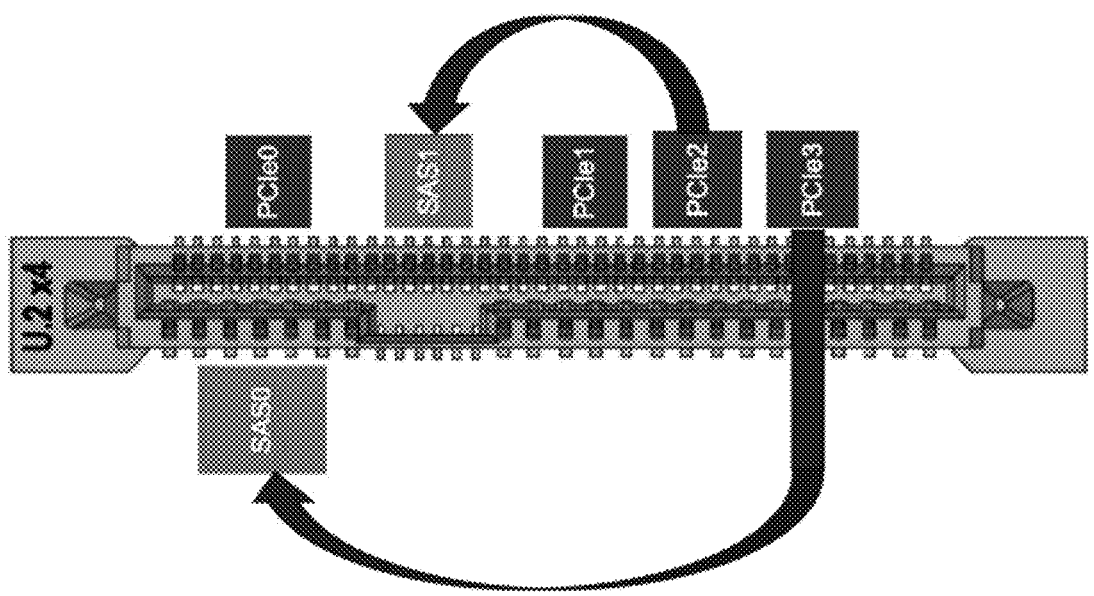
FIG. 3A is a schematic diagram showing the transition of the connector of the U.2 form factor with a single port to the U.3 form factor with a single port.

FIG. 3A is a schematic diagram showing the transition of the connector of the U.2 form factor with a single port to the U.3 form factor with a single port. While the U.2 form factor connector and the U.3 form factor connector are mechanically compatible, i.e., they have the same physical dimension, however, the locations of the PCIe lanes are different.

FIG. 3B is a schematic diagram showing the mechanical overview of the connector of the U.3 form factor with the single port after the transition shown in FIG. 3A. Referring to FIG. 3B, the U.3 form factor has only four lanes instead of the 6 lanes of the U.2 form factor shown in FIG. 3A. In the U.3 form factor, the PCIe Lane 3 (PCIe3) is sharing (multiplexing) with SAS0 (the first port of SAS/SATA/SATAe), and the PCIe Lane 2 (PCIe2) is sharing with SAS1 (the second port of SAS/SATA/SATAe).

Embodiments of the present invention provide a flexible interface that can intelligently determine whether the circuit card is an SAS, PCIe, U.2 single port, U.2 dual port, U.3 single port, or U.3 dual port. Some embodiments described herein utilize physical interfaces of varying sizes. The physical interfaces may include PCIe physical interfaces.

Although the present invention is described in terms of PCIe, the disclosure is not limited to PCIe and can be applied to any type of serial interfaces. Further, although the present invention is described in term of U.2 and U.3 form factors, the present invention is not limited as such. For example, the present invention may be used with any type of circuit cards and any type of devices, such as a 19-inch rack form factor.

Figure 4:
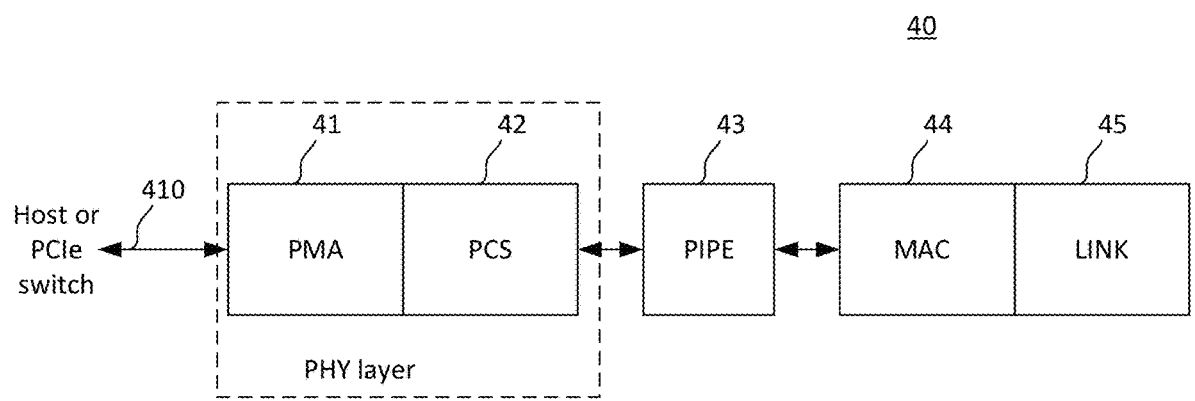
FIG. 4 is a simplified block diagram of an endpoint port that interfaces with a host or PCIe switch through a PCIe link according to an embodiment of the present invention.

FIG. 4 is a simplified block diagram of an endpoint port 40 that interfaces with a host or PCIe switch through a PCIe link 410 according to an embodiment of the present invention. Referring to FIG. 4, the endpoint port 40 may include a PHY layer that includes a physical media attachment (PMA) layer 41 coupled to a physical coding sublayer (PCS) 42. For example, the PMA layer 41 contains analog buffers and SERDES (serialier/deserialier), and the PCS 42 contains the 8b/10b coding functionality. The PMA and PCS form together the PHY transceiver that drives the PCIe link 410. A PIPE (PHY Interface for the PCI Express Architecture) 43 connect the PCS 42 to the PCIe MAC layer 44, which contains a state machine for a link layer 45. The link layer 45 of the endpoint 40 interfaces to a transport layer (not shown).

Figure 5:
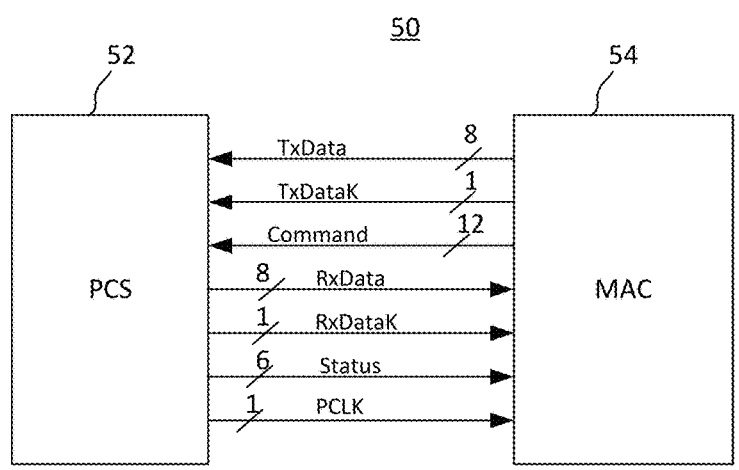
FIG. 5 is a PIPE interface according to an embodiment of the present invention.

FIG. 5 is a PIPE interface 50 according to an embodiment of the present invention. The PIPE interface 50 defines the interface and the functional portioning between a PCS layer 52 and a MAC layer 54. The PIPE interface also identifies a PMA layer. In some embodiments, the TxData, RxData, TxDataK and RxDataK connections may be single-ended signals. In other embodiments, the TxData, RxData, TxDataK and RxDataK connections may be differential signals.

Figure 6:
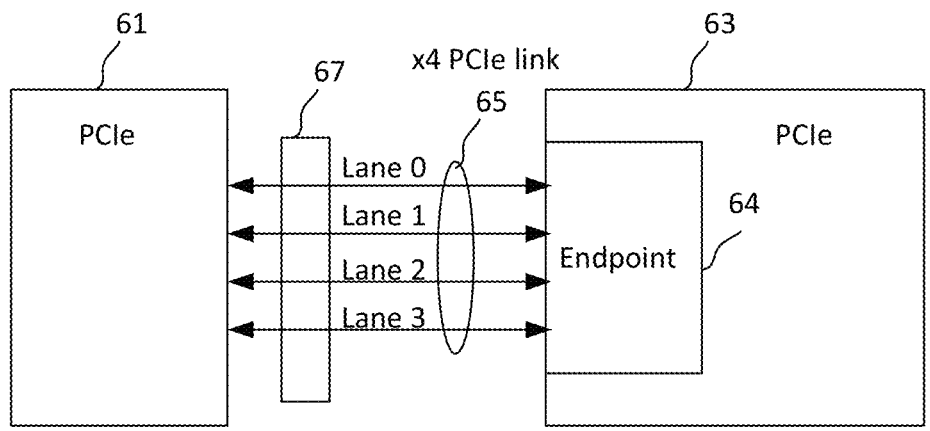
FIG. 6 is a simplified block diagram illustrating an example of a PCIe device in communication with another PCIe device via a ×4 PCIe link.

FIG. 6 is a simplified block diagram illustrating an example of a PCIe device 61 in communication with a PCIe device 63 via a ×4 PCIe link 65. The PCIe device 63 may include one or more endpoints 64 that operate(s) as an I/O controller(s) for the PCIe device 63. The PCIe device 61 may be a host or a PCIe switch disposed on a motherboard, the PCIe device 63 may be a storage device that is connected to the device 61 through a connector 67. Referring to FIGS. 3A and 3B, the device 63 may have a U.2 ×4 form factor, then the PCIe lanes 0, 1, 2 and 3 are arranged in the locations as shown in FIG. 3A. However, if the device 63 has a U.3 ×4 form factor, the PCIe lanes 2 and 3 of the device 63 have to be rearranged to different locations as shown in FIG. 3B.

Figure 7:
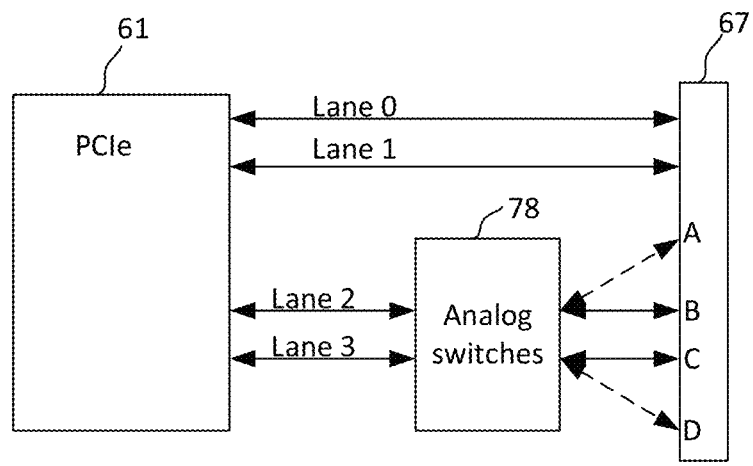
FIG. 7 shows a simplified block diagram of a configuration for rearranging certain PCIe lanes on the motherboard or backplane, according to the prior art.

FIG. 7 shows a simplified block diagram of a configuration for rearranging the PCIe lanes 2 and 3 on the motherboard, daughter board, circuit card, backplane (collectively referred to as motherboard), as known in the prior art. Referring to FIG. 7, analog switches 78 may be disposed on the motherboard between the device 61 and the connector 67 and configured to rearrange the position of the lanes 2 and 3 on different locations (e.g., between locations A and B, C and D) of the connector 67. This analog approach may be appropriate at low speed applications, it is, however, not suitable for high speed applications due to the required noise margin, power consumption, and flexibility requirements.

The present invention proposes a novel solution to insert digital multiplexers between the PHY layer and the PIPE interfaces. This inventive approach is not only appropriate for high-speed applications, but it also provides low-power consumption and system flexibility such that no modification or redesign of the motherboard (printed circuit board) is required.

Figure 8:
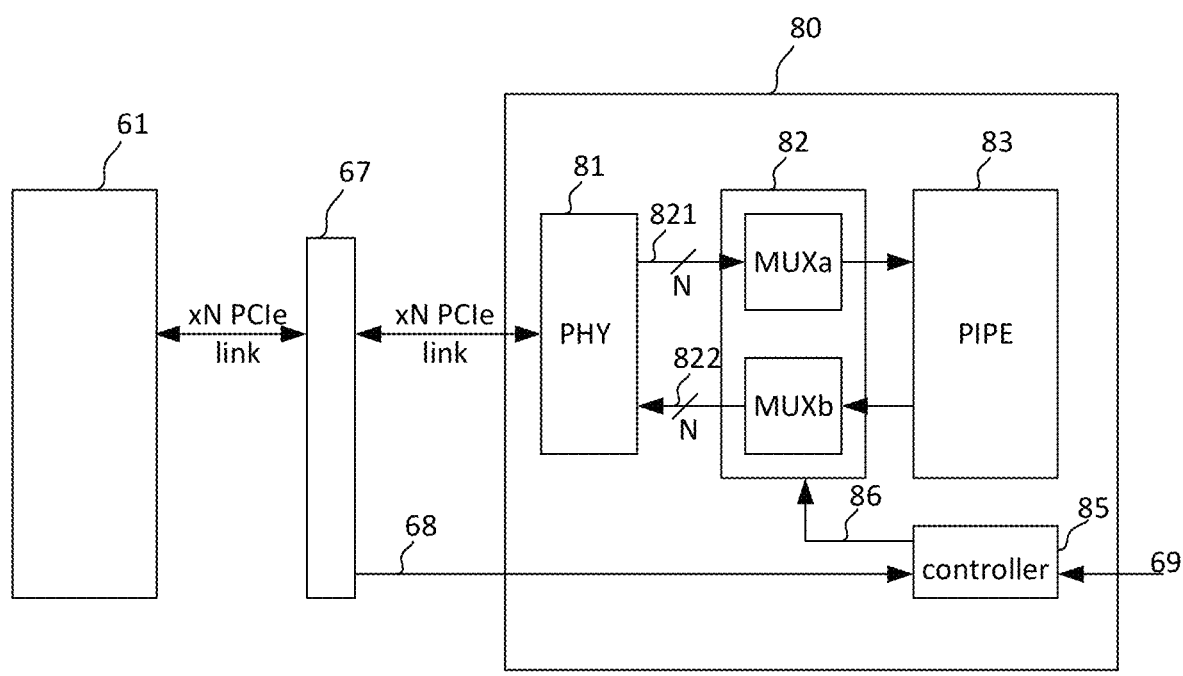
FIG. 8 is a simplified high-level block diagram for a PCIe device having a flexible multiplexer circuit that is operative to automatically rearrange the physical locations of PCIe lanes based on control signals provided by a controller according to an embodiment of the present invention.

FIG. 8 is a simplified high-level block diagram illustrating a PCIe device 80 having a flexible multiplexer circuit that is operative to automatically change the physical locations of PCIe lanes based on control signals provided by a controller according to an embodiment of the present invention. Referring to FIG. 8, the device 80 may include a multiplexer circuit 82 disposed between the PHY layer 81 and the PIPE interface 83. The PHY layer 81 is operative to interface with a ×N PCIe link having an N-lane width. The multiplexer circuit 82 is a digital multiplexer including a first digital multiplexer MUXa for multiplexing received data 821 from the PHY layer to the PIPE interface and a second digital MUXb for multiplexing transmit data 822 from the PIPE interface to the PHY layer 81. The digital multiplexer 82 is controlled by select signals 86 provided by a controller 85 in response to static input signals 68 provided by the connector 67 or control signals 69 provided by an external device (not shown). The controller 85 may include a microcontroller which receives input signals 68 from the connector 67 and outputs select signals 86 to the multiplexer 82. The controller 85 may also include a serial interface for communicating status data of the PCIe device 80 with an external device. The status data may include a COMPLETE signal, an ERROR signal, an IDLE signal, etc.

As with the previously described analog switches in FIG. 7, not the location of every lane of the PCIe link has to be rearranged based on the device form factor (e.g., U.2 ×4, U.3 ×4). In other words, not every lane requires a digital multiplexer. In some embodiments, however, a digital multiplexer is disposed between each received data lane and each transmit lane so that each lane has the same or significantly the same delay or latency. In other embodiments, a delay element may be disposed between the lanes that are not required to be rearranged, the delay element may have a delay the same or significantly the same as the delay of the digital multiplexer so that all lanes between the PHY layer and the PIPE have the same or significantly the same delay.

High Level Description

To support flexible logic and analog multiplexers, it is recommended that analog modules support the following features:

1. It is recommended that analog modules support flexible locations for Lane0 or master lane regardless which PCIe pin is Lane0 or master lane.

2. It is recommended that a flexible allocation of phase locked loops (PLL) to PCIe pins be used regardless which PLL is used for which PCIe pins.

3. It is recommended that each PCIe pin's clock have a flexible alignment mechanism so that multiple PCIe pins among one PCIe link can operate reliably.

As defined previously, the PIPE is the interface between the PHY and MAC layers. To apply this flexible multiplexing mechanism between multiple PCIe controllers and PCIe PHY layers, it is recommended that this flexible multiplexing mechanism is implemented in the PIPE interface.

However, if the application always uses one specific PCIe controller and PCIe PHY, the multiplexing is not limited to the use in the PIPE interface. For example, the multiplexing can be applied directly to the analog-digital interface (the interface between the PCS and PMA layers).

Basically, the multiplexing concept introduces the mapping of each logic lane to any analog pin. For the case of a 4-lanes logical link and 6 analog pins (pin0/pin1/pin2/pin3/pin4/pin5), logical Lane0 (or lane0) can be mapped to any of the analog pin0/pin1/pin2/pin3/pin4/pin5. This mapping is used for both transmit (TX) and receive (RX) directions.

Firmware can program this logical lane to PHY Pin mapping table (see FIG. 10, FIG. 12A, FIG. 13) from other input information, like form factor strapping. In the case of U.2/U.3 form factors, HPT0 (S15), HPT1(E16), DualPortEn #(E25) are used to determine whether it is U.2 or U.3 or Gen-Z, single port or dual port form factor.

Figure 9A:
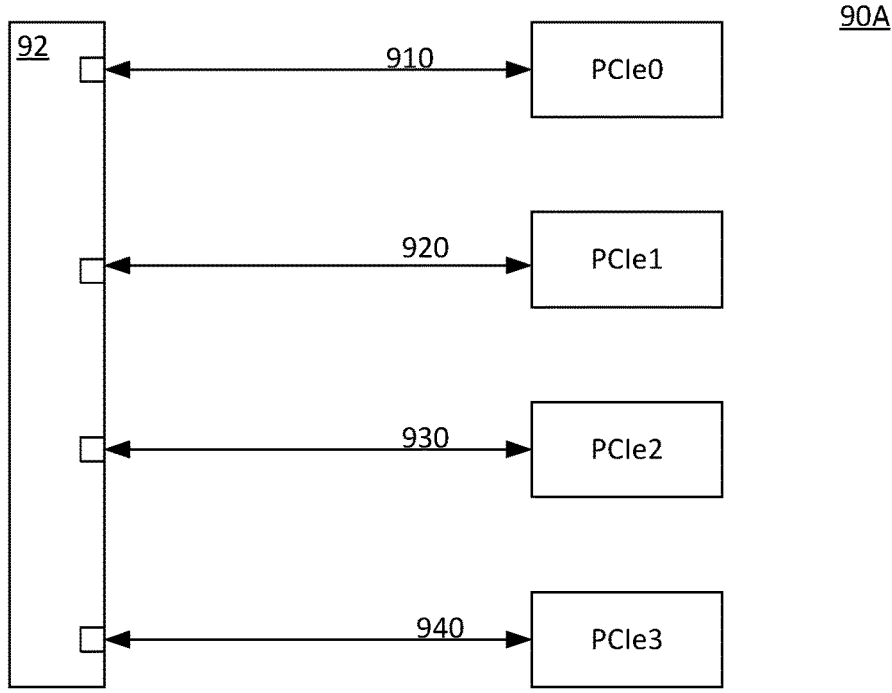
FIG. 9A is a block diagram of a PCIe bifurcation card showing four PCIe devices coupled to a physical interface according to an embodiment of the present invention.

FIG. 9A is a block diagram of an apparatus 90A according to an embodiment of the present invention. The apparatus 90A may be a PCIe bifurcation card that may include one or more PCIe devices. Referring to FIG. 9A, the PCIe devices PCIe0-PCIe3 may be endpoint devices that are coupled to a PCIe interface 92 through respective links 910-940. The PCIe interface 92 may be divided (bifurcated) into a plurality of independent links for supporting one lane (×1), two lanes (×2), four lanes (×4), eight lanes (×8), sixteen lanes (×16), or 32 lanes (×32). The independent links 910-940 can have the same lane width or different lane widths. The PCIe interface 92 can be coupled to a connector of a PCIe slot on a motherboard or on a backplane.

Figure 9B:
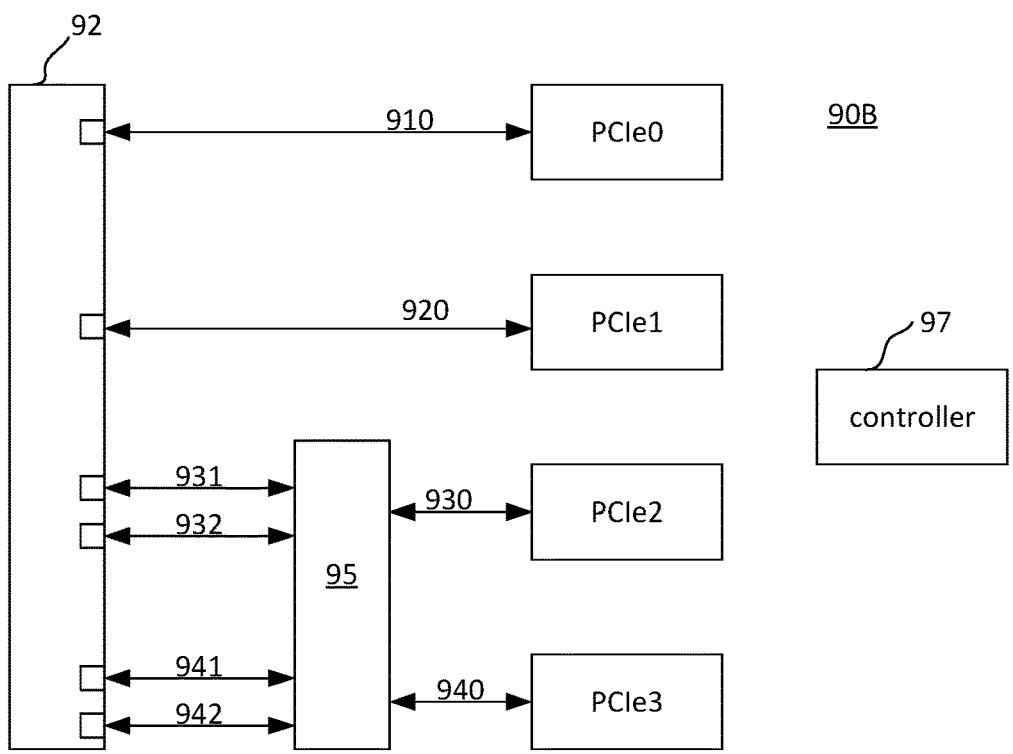
FIG. 9B is a block diagram of an interface apparatus according to an embodiment of the present invention.

FIG. 9B is a block diagram of an apparatus 90B according to an embodiment of the present invention. The apparatus 90B may be a PCIe bifurcation card that may include one or more PCIe devices, such as those described in FIG. 9A. The apparatus 90B may further include a logical-to-physical lane assignment module 95 disposed between the PCIe endpoint devices (e.g., PCIe 2, PCIe 3) and the PCIe interface 92. In one embodiment, the logical-to-physical lane assignment module 95 may include multiplexing (mux) circuitry and demultiplexing (demux) circuitry that can assign the logical lanes (e.g., logical lanes 930, 940) to physical lanes 931 or 932, 941 or 942, respectively, under the control of a controller 97.

Figure 10A:
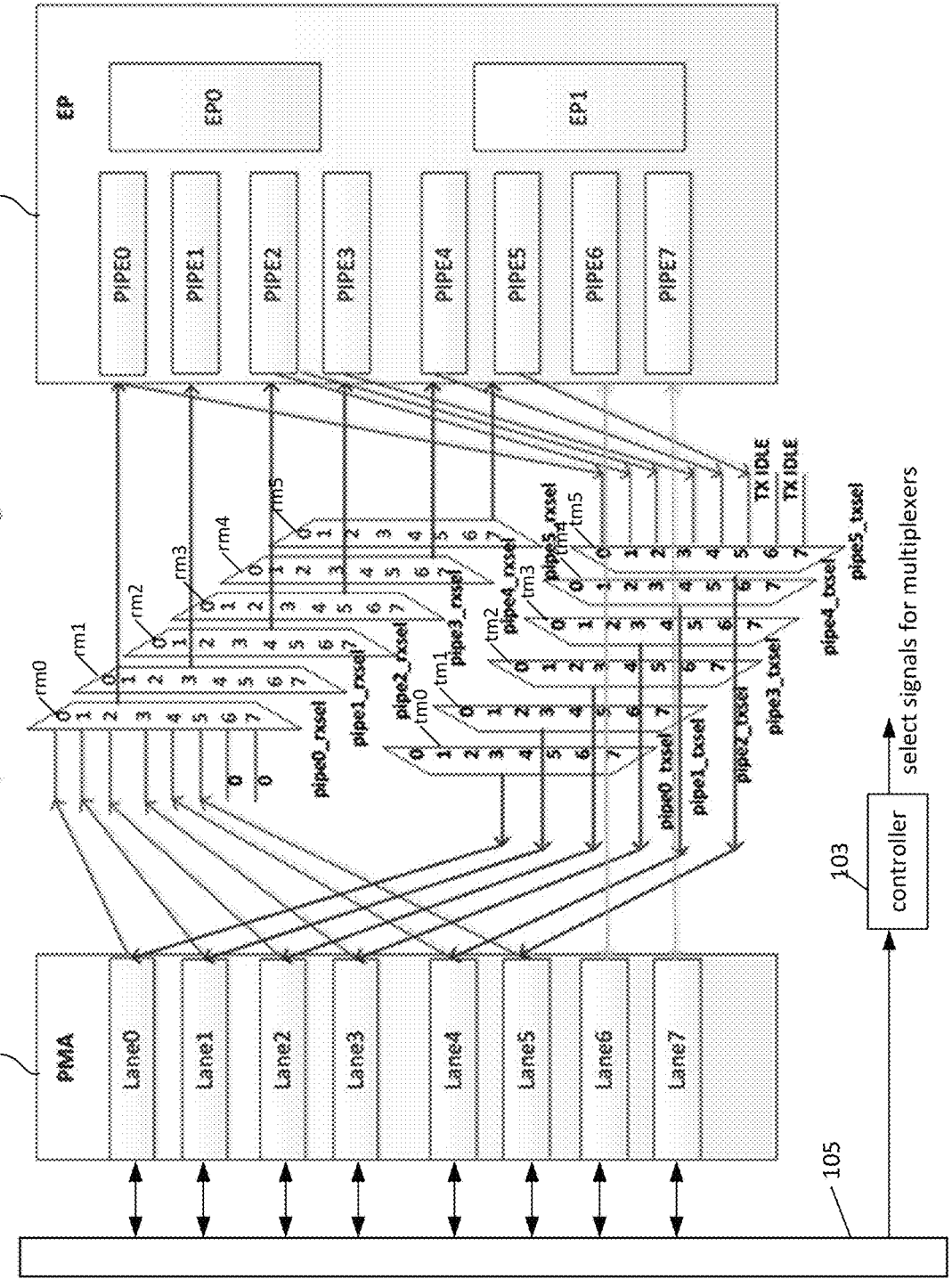
FIG. 10A is a block diagram of an apparatus including a PCIe endpoint device in communication with a physical medium access (PMA) layer (physical interface) according to an embodiment of the present invention.

FIG. 10A is a block diagram of an apparatus 100 including a PCIe endpoint device 101 in communication with a physical medium access (PMA) layer (physical interface) 102 according to an embodiment of the present invention. Referring to FIG. 10A, the endpoint device 101 may include a first endpoint device (block) EP0 and a second endpoint device (block) EP1 configured to support bifurcation links. In an exemplary embodiment, the PMA layer 102 may include eight PCIe lanes (Lane0-Lane7), the bifurcation may include a single-link or a dual-link configuration. In the case of a single link configuration, the first endpoint device EP0 provides a PCIe ×4 connection or link. In the dual-link configuration, each of the endpoint devices EP0 and EP1 provides a PCIe ×2 connection or link. Each of the endpoint devices EP0 and EP1 has four PIPE interfaces, denoted PIPE0~PIPE3 and PIPE4~PIPE7, respectively.

In the PHY level or PHY domain, a minimum of 6 lanes of PCIe pins are needed to support the U.2/U.3 form factors. Referring to FIG. 10A, the PCIe Lane0~Lane5 can be flexibly mapped to the interfaces PIPE0~PIPE3 of the endpoint block EP0, and interfaces PIPE4~PIPE5 of the endpoint block EP1. In one embodiment, six receive multiplexers denoted rm0 through rm5 are disposed between the PMA layer 102 and the PIPE interfaces PIPE0~PIPE5 and configured to connect a lane of the PMA layer to one PIPE interface of the endpoint 101 under the control of a controller 103 in the receive direction. In the embodiment shown, the apparatus 100 also include six transmit multiplexers denoted tm0 through tm5 that are disposed between the PMA layer 102 and the PIPE interfaces PIPE0~PIPE5 and configured to connect a lane of the PMA layer to one PIPE interface of the endpoint 101 under the control of the controller 103 in the transmit direction. In one embodiment, the apparatus 100 may further include a connector 105 coupled to the PMA layer 102. The connector 105 may include a plurality of pins configured to couple the PMA layer (i.e., the physical interface) to a PCIe slot on a motherboard or backplane. The plurality of pins may include configuration pinouts (contacts or terminals) configured to provide electrical signals to the controller 103 to identify the operational mode or configuration of the apparatus 100. The operational modes or configurations can be one of a U.2 single port, a U.2 dual port, a U.3 single port, and a U.3 dual port. The controller 103 may include a microcontroller and a memory device that may include a static random access memory and a read only memory configured to store a software program or instruction codes executable by the microcontroller for assigning or reassigning the logical lanes to the physical lanes based on a selected mode of the plurality of operational modes.

Referring to FIG. 10A, the controller 103 determines based on the electrical signals received from the connector 105 that the EP0 operates as a PCIe ×4 link and the EP1 operates as a PCI2×2 link and configures the six receive multiplexers and transmit multiplexers accordingly. In the present disclosure, the receive multiplexers and the transmit multiplexers are collectively referred to as multiplexers. In some embodiments, the multiplexers are digital multiplexers disposed between the PMA layer and the physical coding sublayer (PCS). In other embodiments, the multiplexers are digital multiplexers disposed between the PCS and the PIPE interfaces. In the example shown, each transmit multiplexer has eight inputs with the first input connected to an output of PIPE0, a second input connected to an output of PIPE1, a third input connected to an output of PIPE2, a fourth input connected to an output of PIPE3, a fifth input connected to an output of PIPE4, a sixth input connected to an output of PIPE5, and the seventh and eighth inputs are available for connection to other PIPE interfaces. Each transmit multiplexer has an output connected to a lane of the PMA layer. Each receive multiplexer has eight inputs with the first input connected to an output of Lane0, a second input connected to an output of Lane1, a third input connected to an output of Lane2, a fourth input connected to an output of Lane3, a fifth input connected to an output of Lane4, a sixth input connected to an output of Lane5, and the seventh and eighth inputs are available for connection to other lanes. Each receive multiplexer has an output connected to an input of a PIPE interface. In the example embodiment, the seventh and eighth inputs of the receive multiplexer are connected to ground, and the seventh and eighth inputs of the transmit multiplexer may also be connected to ground.

With such flexible connection, ideally, any two PHY lanes can be connected to the first endpoint block EP0 to group or form an EP0 ×2 PCIe link and any other two PHY lanes can be connected to EP1 to group or form an EP1 ×2 PCIe link. And also in the single link configuration, any four PHY lanes can be connected to the first endpoint block EP0 to group as an EP0 ×4 PCIe link.

It is understood that FIG. 10A only shows dual PCIe links including eight PCIe PHY lanes. However, the invention itself is not limited to such configuration. Embodiments of the present invention can be applied to more PCIe links and more PCIe PHY lanes. For example, in an embodiment, a circuit card may include a plurality of endpoint devices (blocks) coupled to a PCIe interface. The endpoint devices can be bifurcated to provide a plurality of independent links that are connected to the PCie interface. The PCIe interface is automatically configured to be a U.2 or U.3 or Gen-Z, single port or dual port form factor and insert into a PCIe slot (a connector on a motherboard or backplane). In one embodiment, the endpoint devices can be equally bifurcated to provide a plurality of independent links with equal lane width. In another embodiment, the endpoint devices can be unequally bifurcated to provide a plurality of independent links with unequal lane widths, e.g., some links have 2 lanes, some other links have 4 lanes, and some yet other links have 8 lanes, etc.

Master Lane or Lane 0 Location

In a PCIe link having multiple lanes, the master lane or lane 0 is a special lane. On the PCIe controller side, the lane 0 is used to control operations of a state machine. If lane 0 doesn't exist, the state machine normally will not proceed unless a lane reversal mechanism is applied to relocate another lane to be lane 0. However, if other lanes do not exist, the state machine may proceed and group (assign) the PCIe link with fewer lanes (e.g., ×2 or ×1 link instead of ×4 link).

Generally, some signals or clock are common to multiple lanes. In this case, either the common signals are brought out from the PCIe PHY layer, or lane 0 signals are used directly. In accordance with the present invention, the location of lane 0 is programmable, and can be configured by software, hardware, or a combination thereof.

With regard to a portion of the PCIe PHY interface, the lane 0 is critical and operates as a master lane. The multiple lanes of a PCIe link are operated as slave lanes following lane 0 operations. The slave clocks are normally synchronized to the master lane. Power management control signals of slave lanes are either compared against master lane signals or simply discarded, so that software programs or instruction codes are required to define the location of the PCIe PHY lane 0.

Clocking

Since the logical lane to the PHY lane multiplexing (muxing) is flexible, the associated clock is recommended to be either the same among the logical lanes and physical lanes, or with a minimal number of simple multiplexers (muxes).

To satisfy this purpose, it is recommended not to use a recovered clock per lane (logical lane or physical lane) because the logic circuitry will become complicate for multiplexing recovered clocks.

It is recommended to use a PIPE clock. For PCIe links that have multiple lanes, the PIPE clocks among the multiple lanes are the same. As shown in FIG. 4, the PCIe protocol is a layered protocol with the PIPE interface connected between the MAC layer and the PHY layer. The PIPE layer provides digital data to the PHY layer that converts the digital data into an analog form for transmission to a host or PCIe switch. So regardless of the link width of a connection, it is easier and simpler to implement the clock in the PIPE interface.

In the bifurcation case, the EP0 PIPE clock and EP1 PIPE clock will be of different frequencies and phases. In the bifurcation case, the PCIe PHY layer is required to output the EP0 PIPE clock and the EP1 PIPE clock. The logic layer needs to multiplex the EP0 PIPE clock and EP1 PIPE clock with a simple clock multiplexer (depending on whether or not the apparatus enables bifurcation).

The apparatus according to the present invention can flexibly output the EP0 PIPE clock and EP1 PIPE clock at different pin locations of the PCIe PHY layer to satisfy actual applications.

Figure 10B:
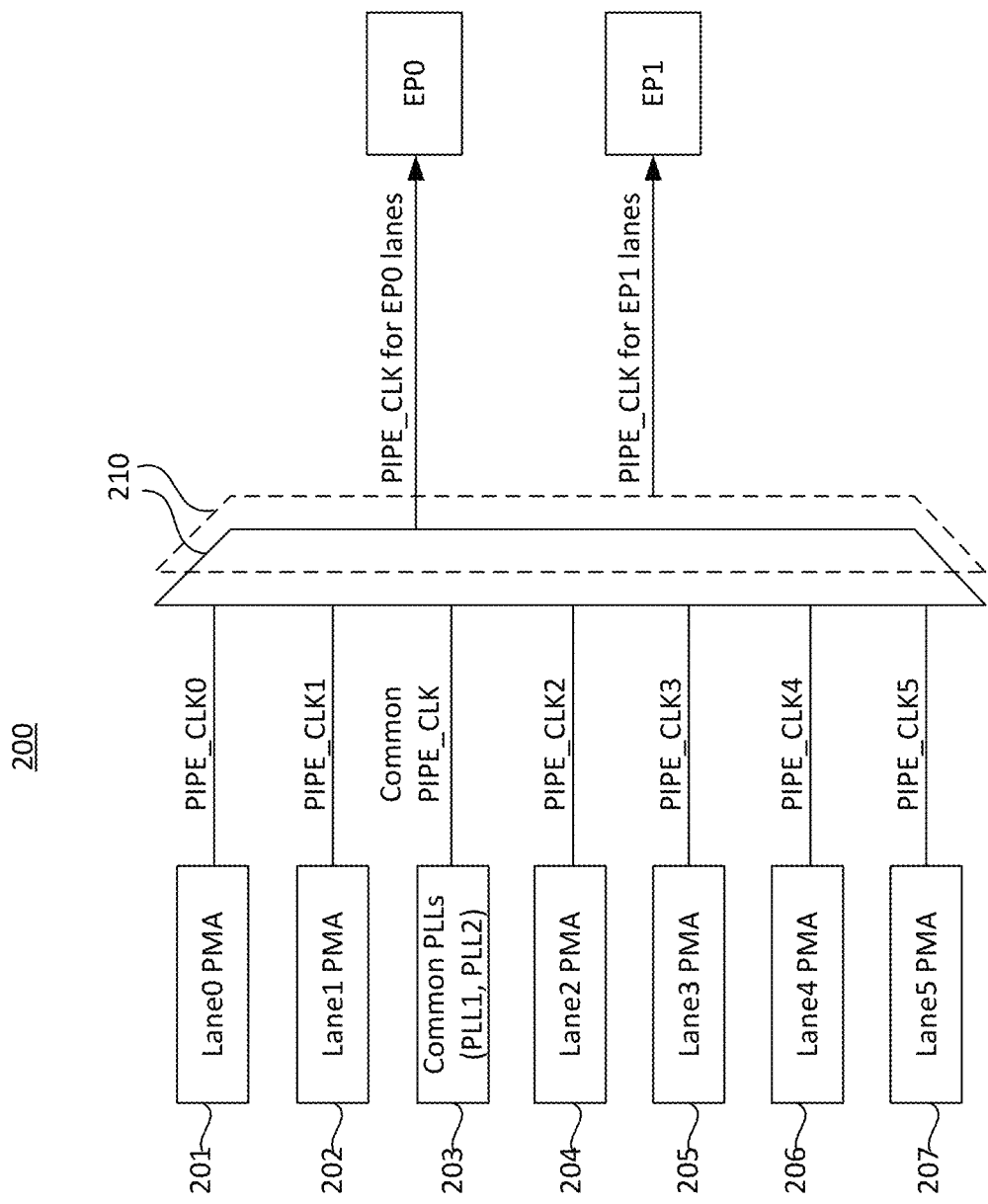
FIG. 10B is a block diagram illustrating a clocking scheme for the endpoint devices according to an embodiment of the present invention.

FIG. 10B is a block diagram illustrating a clocking scheme 200 for the endpoint devices according to an embodiment of the present invention. Referring to FIG. 10B, the clocking scheme 200 may include a physical medium access (PMA) layer including a lane0 201, a lane1 202, a common PLL module 203, a lane2 204, a lane3 205, a lane4 206, and a lane5 207. Each of the lanes may have its own clock PIPE_CLK provided by its own phase locked loop (PLL). For example, lane0 has clock PIPE_CLK0, lane1 has clock PIPE_CLK1, lane2 has clock PIPE_CLK2, lane3 has clock PIPE_CLK3, lane4 has clock PIPE_CLK4, lane5 has clock PIPE_CLK5, and the common PLL module 203 may have a first PLL1 circuit and a second PLL2 circuit. The clock signals are provided to a multiplexer unit 210 comprising a plurality of multiplexers configured to provide selected clock signals to the PIPE interfaces associated with the endpoint devices EP0 and EP1. In one embodiment, if each lane has its own PIPE-CLK generated by its own PLL circuit, all the lanes can operate with a single PIPE_CLK selected by the multiplexer unit 210. Alternatively, each of the lanes can operate with its own PIPE_CLK, with asynchronous FIFOs implemented between its own PIPE_CLK and the PIPE_CLK on the endpoints EP0 and EP1. Alternatively, if the lanes do not have their own PIPE clocks, a common clock provided by the common PLL module 203 may be used and fed to the digital logic of each lane, as well as the endpoints EP0 and EP1. In some embodiments, additional clock multiplexers are used to select an appropriate PIPE clock for the PIPE interfaces of the endpoint devices EP0 and EP1. In an embodiment, the common PLL module 203 may include the first PLL circuit PLL1 configured to generate a first PIPE clock and the second PLL circuit PLL2 configured to generate a second PIPE clock. The appropriate PIPE clocks for the PIPE interfaces are selected by the multiplexer unit 210. The lanes associated with a PCIe link may operate at a common link clock rate, i.e., same clock frequency and clock phase. The endpoints EP0 and EP1 may operate at a core clock frequency, as well as at PIPE_CLK for PIPE logic associated with a lane. The clock frequency and phase for core logic may be the same or different from the PIPE_CLK. The PIPE_CLK for the endpoints EP0 and EP1 may have the same clock frequency and phase or different clock frequencies and phases as those of the PIPE_CLK of each lane of the PCS.

U.2 and U.3 Implementation Examples

Figures 11A, 11B, 11C:
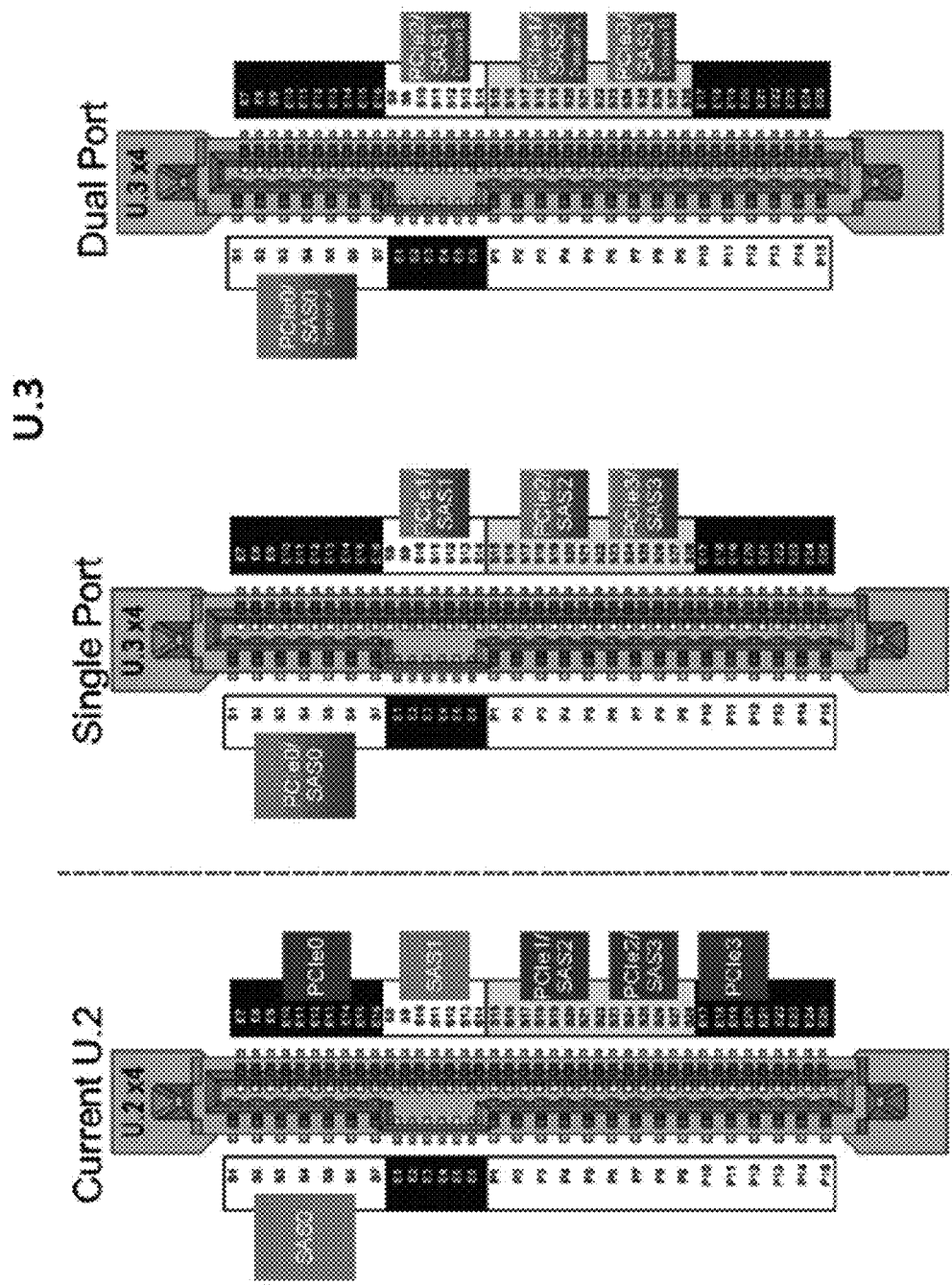
FIG. 11A shows the pinout of an existing U.2 form factor.
FIG. 11B shows a U.3 form factor with a single port configuration.
FIG. 11C shows a U.3 form factor with a dual port configuration.

FIG. 11A shows the pinout of an existing or current U.2 form factor. Referring to FIG. 11A, the current U.2 form factor includes 6 links of high speed lanes. The left side of the U.2 form factor includes a SAS0 link, and the right side of the U.2 form factor includes from top to bottom a PCIe0 link, a SAS1 link, a PCIe1/SAS2 link, a PCIe2/SAS3 link, and a PCIe3 link.

FIG. 11B shows a U.3 form factor with a single port configuration. Referring to FIG. 11B, the left side includes a PCIe0/SAS0, and the right side includes from top to bottom, a PCIe1/SAS1 link, a PCIe2/SAS2 link, and a PCIe3/SAS3 link. The U.3 single port configuration has only 4 links of high speed lanes instead of six links of high speed lanes in U.2 of FIG. 11A.

FIG. 11C shows a U.3 form factor with a dual port configuration. Referring to FIG. 11C, the left side includes a PCIe0/SAS0, and the right side includes from top to bottom, a PCIe2/SAS1 link, a PCIe1/SAS2 link, and a PCIe3/SAS3 link. The U.3 single port configuration has only 4 links of high speed lanes instead of six links of high speed lanes in U.2 of FIG. 11A. The U.3 form factor can thus reduce system costs with regard to the U.2 form factor.

Figures 12A, 12B:
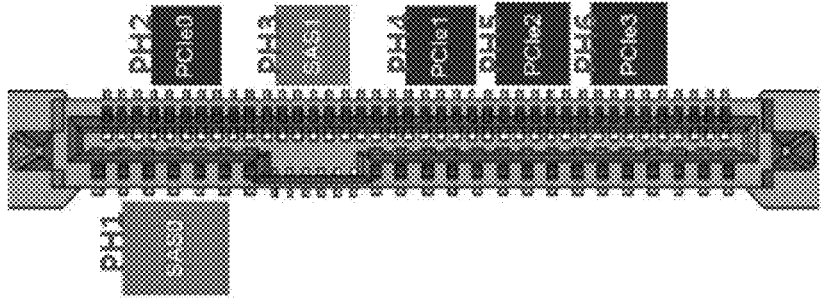
FIG. 12A shows a Table 1 that maps physical links to logical links according to an embodiment of the present invention.
FIG. 12B shows the physical pinout of the physical lanes PH1, PH2, PH3, PH4, PH5, and PH6 of a PCIe connector.

FIG. 12A shows Table 1 that maps the physical links to the logical links according to an embodiment of the present invention. Referring to FIG. 12A, Table 1 includes five rows with the first row listed the physical lanes denoted PH1, PH2, PH3, PH4, PH5 and PH6, the second row denoted 1×4, the third row denoted 2×2, the fourth row denoted 1×2, and the fifth row denoted 1×1. Each of the second to fifth row has two sub-rows denoted U2 for the U.2 form factor and U.3 for the U.3 form factor. The sub-row 1×4 U2 refers to the U.2 1×4 link having 4 lanes, where the physical lanes PH2/PH4/PH5/PH6 are grouped as one PCIe ×4 link. The sub-row 1×4 U3 refers to the U.3 1×4 link, where the physical lanes PH1/PH3/PH4/PH5 are grouped as one PCIe ×4 link.

The sub-row 2×2 U2 refers to the U.2 having 2 links each having 2 lanes, where the physical lanes PH2/PH4 are grouped to form the link PCIe0 ×2 link, and the physical lanes PH5/PH6 are grouped to form the PCIe1 ×2 link.

The sub-row 2×2 U3 refers to U.3 having 2 links each having 2 lanes, where the physical lanes PH1/PH4 are grouped to form the PCIe0 ×2 link, and the physical lanes PH3/PH5 are grouped to the PCIe1 ×2 link.

The sub-row 1×2 U2 in the fourth row refers to the U.2 form factor having 1 link with 2 lanes, where the physical lanes PH2/PH4 are grouped to form the PCIe0 ×1 link.

The sub-row 1×2 U3 in the fourth row refers to the U.3 form factor having 1 link with 2 lanes, where the physical lanes PH1/PH3 are grouped to form the PCIe0 ×1 link.

The sub-row 1×1 U2 in the fifth row refers to the U.2 form factor having 1 link with 1 lane, where the physical lane PH2 forms the PCIe0 ×1 link.

The sub-row 1×1 U3 in the fifth row refers to the U.3 form factor having 1 link with 1 lane, where the physical lane PH1 forms the PCIe0 ×1 link.

FIG. 12B shows the physical pinout of the physical lanes PH1, PH2, PH3, PH4, PH5, and PH6. As shown in FIG. 12B, the physical lane PH1 is on the left side (primary side) of the connector and the physical lanes PH2/PH3/PH4/PH5/PH6 are on the right side (secondary side) of the connector.

FIG. 13 shows Table 2 illustrating exemplary implementations for U.2, U.3, 1×4 and 2×2 configurations according to an embodiment of the present invention. Table 2 includes seven columns 1301 to 1307 with the first column 1301 denotes the PCIE PHY pins, the second column 1302 denotes a port 0 with a link having ×8 lanes, the third column 1303 denotes a port 0 with a link having ×4 lanes and a port 1 with a link having ×4 lanes, the fourth column 1304 denotes a U.2 form factor having a single port with 4 lanes, the fifth column 1305 denotes a U.2 form factor having dual ports each with 2 lanes, the sixth column 1306 denotes a U.3 form factor having a single port with 4 lanes, and the seventh column 1307 denotes a U.3 form factor having dual ports each with 2 lanes. Table 2 includes 11 rows 1321 to 1331 with the first row 1321 providing the headers for the seven columns, second to ninth rows 1322-1329 providing the physical pins, the port(s) and associated logical lanes, the tenth row providing the logical lane(s) and associated physical pin number(s), and the eleventh row providing the PCIe PHY setting for the different configurations.

Figure 14:
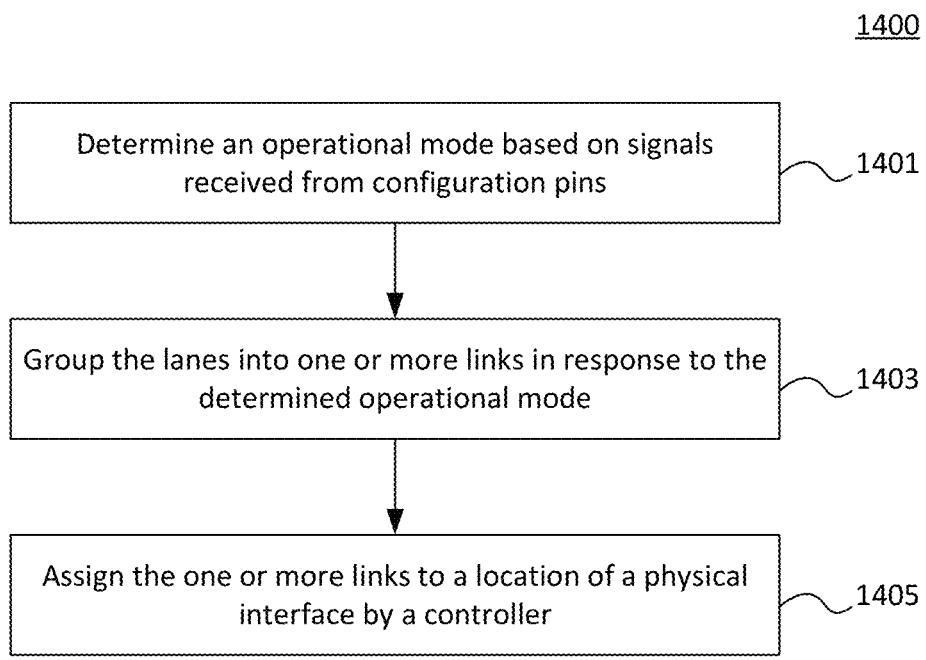
FIG. 14 is a flowchart showing a method for assigning lanes to interfaces of an interface apparatus having a plurality of lanes coupled to an endpoint device having the interfaces through a plurality of multiplexers, wherein the apparatus supports a plurality of operational modes and configurations, according to some embodiments of the present invention.

FIG. 14 is a flowchart showing a method 1400 for assigning lanes to interfaces of an apparatus having a plurality of lanes coupled to an endpoint device having the interfaces through a plurality of multiplexers, wherein the apparatus supports a plurality of operational modes, according to embodiments of the present invention. The method 1400 may include determining an operational mode of the apparatus based on electrical signals received from certain configuration pins (1401). The method 1400 may further include grouping the lanes into one or more links in response to the determined operational mode (1403). The method 1400 may also include assigning the one or more links to a physical location (pins) of a physical interface using a controller (1405).

Figure 15:
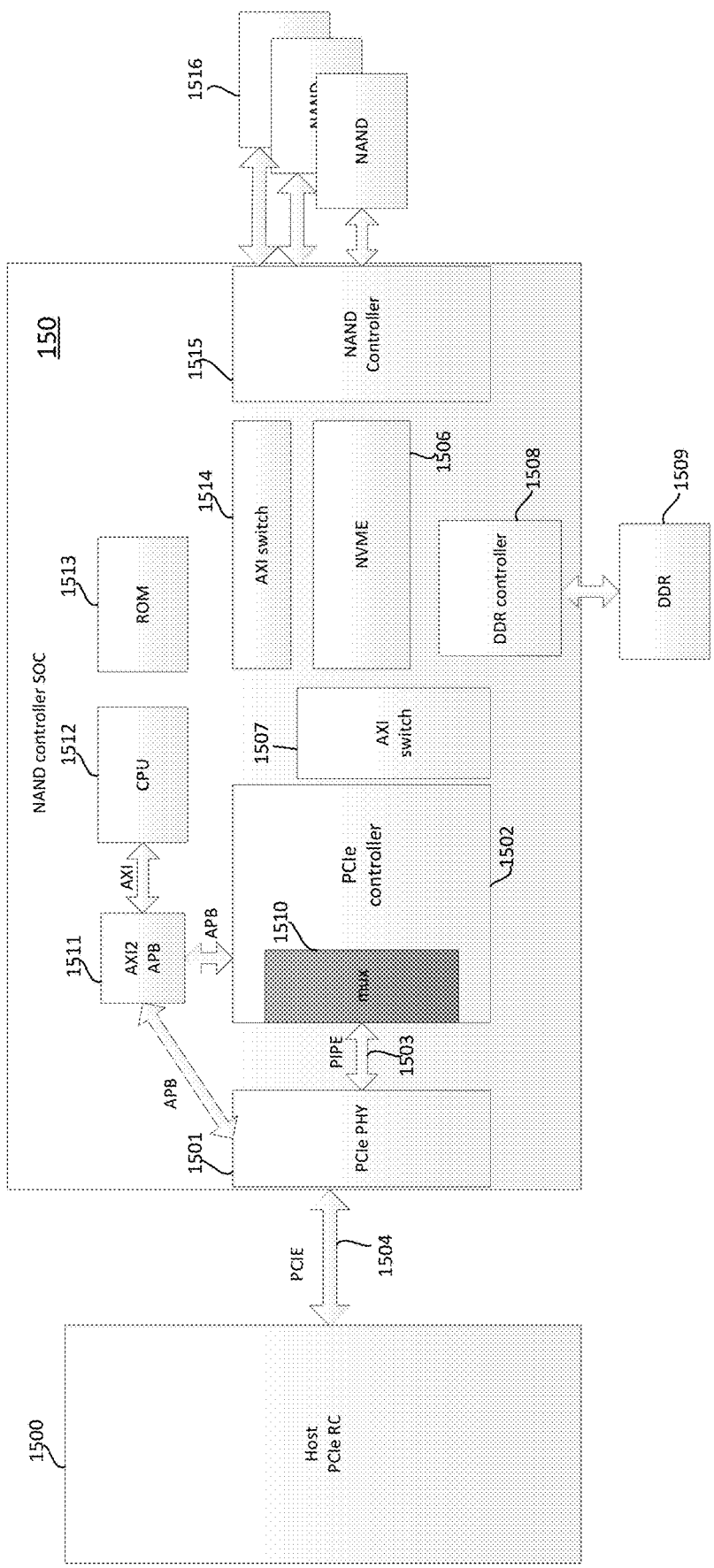
FIG. 15 is a simplified block diagram illustrating an integrated circuit in communication with a host having a PCIe module with a root complex according to some embodiments of the present invention.

FIG. 15 is a block diagram illustrating an integrated circuit 150 in communication with a host having a PCI Express module with a root complex according to some embodiments of the present invention. In some embodiments, the integrated circuit 150 may be a NAND controller system on-chip (SOC). The integrated circuit 150 may include a PCIe physical layer (PHY) interface unit 1501 for exchanging commands and data with a host 1500 having a PCI Express module with a root complex (PCIe RC) via a PCIe link 1504. The integrated circuit (NAND controller SOC) 150 may further include a PCIe controller unit 1502 in communication with the PCIe PHY unit 1501 through a PIPE interface 1503. The integrated circuit 150 may further include a nonvolatile memory express (NVMe) module 1506, which can be in communication with the host 1500 or a double data rate (DDR) memory 1509. In some embodiments, the NVMe module 1506 may be configured to communicate with the DDR memory 1509 using a DDR controller 1508. In some embodiments, the NVMe module 1506 may be configured as an AXI master.

In some embodiments, the NVMe module 1506 may be configured to communicate with the host 1500 using an AXI switch 1507. In some embodiments, the integrated circuit 150 may further include a multiplexer unit or module 1510 including a plurality of digital transmit multiplexers and a plurality of receive multiplexers such as the tm0 to tm5 and rm0 to rm5 shown in FIG. 10.

Still referring to FIG. 15, the integrated circuit 150 may further include an AXI to APB conversion module 1511 disposed between the PCIe PHY unit 1501 and a CPU 1512. The AXI to APB conversion module 1511 is configured to translate the AXI communication to the advanced peripheral bus (APB), The CPU 1512 may also communicate with the PCIe controller 1502 which includes the multiplexer unit or module 1510 via the AXI to APB conversion module 1511. The integrated circuit 150 may also include other memory units such as static random access memory (SRAM) and read-only memory (ROM) 1513 configured to store program instructions and data constructs that are executable by the CPU to provide the functionality of the present invention. The CPU 1512 may communicate with the NVMe module 1506 through an AXI switch 1514. In the example, the CPU 1512 operates on the AXI communication protocol. It is understood that the CPU 1512 may have multiple processing units each may operate on different communication protocols, e.g., advanced high performance bus (AHB), APB, PCIe communication protocol, etc. The integrated circuit 150 may also include NAND flash controller 1515 in communication with one or more NAND flash memory devices 1516.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

In summary, PCIE PHY needs to provide flexibility to group arbitrary lanes into one PCIe link. The clock selection, reset selection, power management control should all provide such flexibility. Master lane or Lane 0 can be put in any location.

PCIe MAC controller should also provide flexibility to re-group lane 0 location, as well as other slave lanes.

Although embodiments of the present invention are described using U.2 and U.3 form factors and PCIe connectors, it is understood that the embodiments may also be applied to other different form factors that can be smaller than the U.2 form factor, have a number of lanes and/or links larger than those of the PCIe standard, and operate at data rates higher than the PCIe standard.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

What is claimed is:

1. An apparatus supporting a plurality of operational modes, the apparatus comprising:
    a physical interface including a plurality of lanes, a physical access attachment (PMA) layer coupled to the lanes, and a physical coding sublayer (PCS), the plurality of lanes being configured to connect to a connector;
    an endpoint device including a plurality of interfaces;
    a plurality of multiplexers disposed between the physical interface and the endpoint device; and
    a controller configured to route a first portion of the lanes to a first portion of the interfaces through the multiplexers in response to a selected mode of the plurality of operational modes.

2. The apparatus of claim 1, wherein the multiplexers are digital multiplexers disposed between the PMA layer and the PCS.

3. The apparatus of claim 1, wherein the multiplexers are digital multiplexers disposed between the PCS and the interfaces.

4. The apparatus of claim 1, wherein the interfaces conform to a PHY interface for PCI Express Architecture (PIPE) specification.

5. The apparatus of claim 1, wherein a portion of the lanes forms at least one PCI Express (PCIe) link.

6. The apparatus of claim 5, wherein the at least one PCIe link comprises one of a ×32, ×16, ×8, ×4, ×2, and ×1 lane width.

7. The apparatus of claim 1, wherein the endpoint device comprises a first endpoint block configured to provide the first portion of the lanes to a first link and a second endpoint block configured to provide a second portion of the lanes to a second link.

8. The apparatus of claim 7, wherein the first link comprises one of a ×32, ×16, ×8, ×4, ×2, and ×1 lane width, and the second link comprises one of a ×32, ×16, ×8, ×4, ×2, and ×1 lane width.

9. The apparatus of claim 1, wherein the connector comprises a plurality of pins configured to couple the physical interface to a PCIe slot on a motherboard or backplane.

10. The apparatus of claim 9, wherein the plurality of pins comprise configuration pins coupled to the controller and configured to provide electrical signals defining the selected mode of the plurality of operational modes.

11. The apparatus of claim 1, wherein the controller comprises a software program stored in a memory device, the software program comprising instructions executable by the controller to perform a reassignment of a portion of the lanes to a portion of the interfaces using the multiplexers based on the selected mode of the plurality of operational modes.

12. The apparatus of claim 9, wherein the controller is further configured to assign a lane 0 (zero) to a pin of the plurality of pins based on the selected mode.

13. The apparatus of claim 1, wherein the operational modes comprise one of a U.2 single port, a U.2 dual port, a U.3 single port, and a U.3 dual port.

14. The apparatus of claim 1, wherein the controller performs a regrouping of the interfaces and a logical-to-physical lane reassignment of the regrouped interfaces through the multiplexers in response to a change of the selected mode.

15. The apparatus of claim 1, wherein the physical interface further comprises a clock synchronizer configured to synchronize a clock signal of the plurality of lanes.

16. A method for assigning lanes of a physical interface to interfaces of an apparatus having a plurality of lanes coupled to an endpoint device having the interfaces through a plurality of multiplexers, the apparatus supporting a plurality of operational modes, the method comprising:
    determining a selected mode of the plurality of operational modes;
    grouping the interfaces into one or more links in response to the selected mode; and
    assigning the one or more links to a location of the physical interface through the multiplexers by a controller,
    wherein the physical interface comprises a physical access attachment (PMA) layer coupled to the lanes, and a physical coding sublayer (PCS),
    wherein the lanes are configured to connect to a connector, and the multiplexers are disposed between the PMA layer and the PCS or between the PCS and the interfaces.

17. The method of claim 16, wherein the one or more links each comprise one of a ×32, ×16, ×8, ×4, ×2, and ×1 lane width.

18. The method of claim 16, wherein determining the selected mode comprises:
    providing electrical signals of configuration pins of the connector to the controller.

19. The method of claim 16, wherein the one or more links each comprise an equal lane width.

20. The method of claim 16, wherein the one or more links each comprise an unequal lane width.

* * * * *